US010431441B2

(12) United States Patent
Honkala et al.

(10) Patent No.: US 10,431,441 B2
(45) Date of Patent: Oct. 1, 2019

(54) REDUCING CALIBRATION OF COMPONENTS IN AN IMAGING PLATE SCANNER

(71) Applicant: PaloDEx Group OY, Tuusula (FI)

(72) Inventors: Jorma Honkala, Kauniainen (FI); Ari Hannu Tapio Koskikallio, Kerava (FI); Kaapo Paulanto, Nurmijärvi (FI); Doan Ha Nguyen, Helsinki (FI)

(73) Assignee: PALODEX GROUP OY, Tuusula (FI)

( * ) Notice: Subject to any disclaimer, the term of this patent is extended or adjusted under 35 U.S.C. 154(b) by 0 days.

(21) Appl. No.: 15/885,599

(22) Filed: Jan. 31, 2018

(65) Prior Publication Data

US 2019/0237312 A1    Aug. 1, 2019

(51) Int. Cl.
*H01J 43/16* (2006.01)
*H01J 43/30* (2006.01)

(52) U.S. Cl.
CPC ............. *H01J 43/30* (2013.01); *H01J 43/16* (2013.01)

(58) Field of Classification Search
CPC .. H01J 43/20; H01J 43/04; H01J 43/22; H01J 43/246
See application file for complete search history.

(56) References Cited

U.S. PATENT DOCUMENTS

| 7,049,747 | B1 * | 5/2006 | Goodberlet | H01J 43/04 313/532 |
| 8,324,580 | B1 | 12/2012 | Gagnon et al. | |
| 2006/0223169 | A1 * | 10/2006 | Bedingham | G01N 21/645 435/287.2 |
| 2013/0242291 | A1 * | 9/2013 | Eaton | H01J 43/28 356/237.1 |
| 2014/0151529 | A1 * | 6/2014 | Steiner | H01J 43/20 250/207 |

OTHER PUBLICATIONS

MESA International, "MES Explained: A High Level Vision," MESA International—White Paper No. 6, Sep. 1997.

(Continued)

*Primary Examiner* — David P Porta
*Assistant Examiner* — Fani Boosalis
(74) *Attorney, Agent, or Firm* — Michael Best & Friedrich LLP

(57) ABSTRACT

A photomultiplier tube for use in an imaging plate scanner. In one embodiment, the photomultiplier tube includes a housing having a window; a focusing electrode located in the housing; an electron multiplier dynode located in the housing; an anode; a cathode and a memory storing parameters. Another embodiment provides An imaging plate scanner including a photomultiplier tube having a window, an anode, and a cathode; a light source positioned to radiate light on the anode or cathode; and an electronic processor communicatively coupled to the light source and configured to generate a supply voltage value for the photomultiplier tube, activate the light source and determine an output current of the anode or of the cathode, and generate an error message if the output current deviates from an expected current range. A power supply is electrically connected to the electronic processor and configured to generate the supply voltage.

18 Claims, 5 Drawing Sheets

(56) References Cited

OTHER PUBLICATIONS

Garcia-Verdugo, "Basics of Process Capability," copied from source website https://www.slideshare.net/JGarcaVerdugo/basics-of-process-capability, Aug. 14, 2015.
Hessing, "Process Capability (Cp & Cpk)," Retrieved from: https://sixsigmastudyguide.com/process-capability-Cp-Cpk/, Six Sigma Study Guide, Sep. 10, 2014.
Krolczyk et al., "Material Flow Optimization—A Case Study in Automotive Industry," J.B. Krolczyk et al., ISSN 1330-3651, Tehnical Gazette 22, 6(2015), pp. 1447-1456.
ET Enterprises Limited, "Understanding photomultipliers," published 2011.
Hamamatsu, "Photomultiplier Tubes: Basics and Applications," Hamamatsu Photonics K.K., Third Edition, 2007.
European Patent Office Search Report for Application No. 19154790, dated May 23, 2019, 4 pages.
Nguyen "A Study about the Elimination of Component External Calibration in Intraoral Imaging Plate Scanner." 2018, 43 pages.
Anonymous, "Photomultiplier tube." Wikipedia, The Free Encyclopedia. Jun. 27, 2019, 18:42 UTC. Available at: https://en.wikipedia.org/w/index.php?title=Photomultiplier_tube&oldid=903751263, 10 pages.

\* cited by examiner

REDUCING CALIBRATION OF COMPONENTS IN AN IMAGING PLATE SCANNER

BACKGROUND OF THE INVENTION

Intraoral imaging is often accomplished using electronic image sensors. Electronic image sensors use a scintillator to convert x-rays to photons and photons are directed to a sensor, for example a CMOS image sensor. Imaging plates may also be used to capture images. An imaging plate includes a phosphor layer that stores x-ray energy and emits light when irradiated, for example, by laser light. Light emitted by an imaging plate is captured and processed by a scanner to generate an intraoral image.

The scanner is part of an imaging plate system. Such systems generally provide high-quality intraoral images with desirable workflow. Among other components, a scanner in an imaging plate system generally includes a photo-multiplier tube, a light collector, and a light source (which may, for example, be a laser or a laser and mirror assembly).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
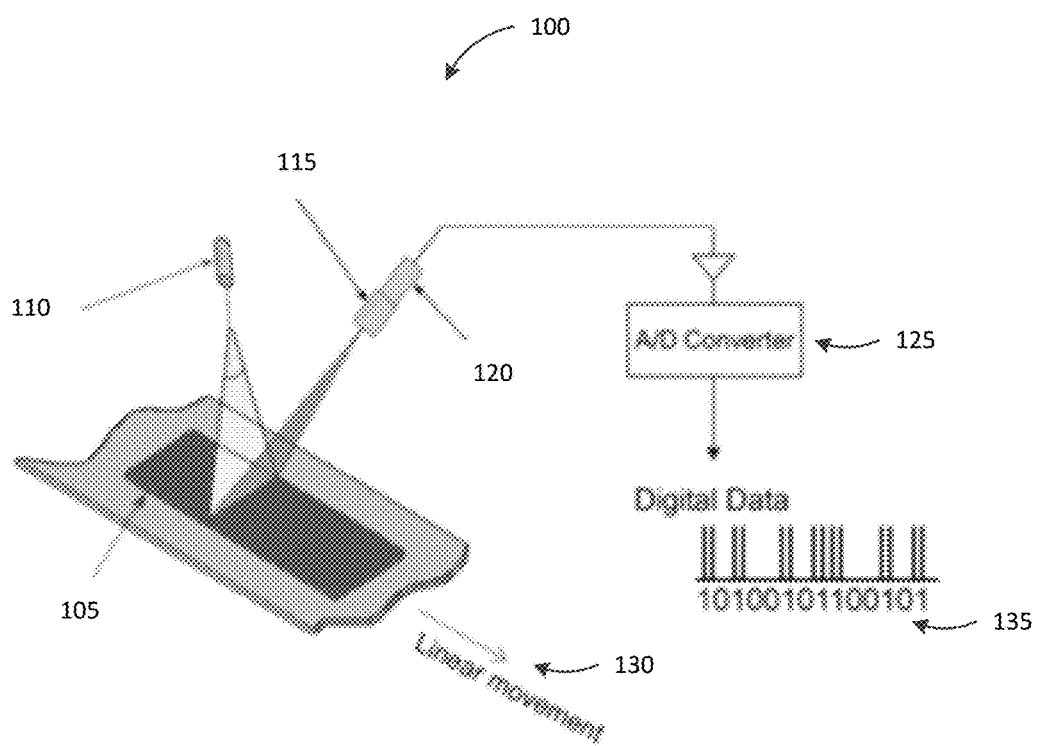
FIG. 1 illustrates a system for scanning a radiated imaging plate to form an image according to one embodiment.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In many instances, it is necessary to calibrate an imaging system or one or more components of the imaging plate system. Calibration is a process of determining the measuring or operational accuracy of a system or component. Often, calibration requires an external calibration device or calibrator. For example, in an intraoral imaging plate scanner or reader production line, photomultiplier tubes are calibrated using calibration equipment.

The calibration process takes time and calibration equipment adds to the cost of manufacturing. It would be beneficial, therefore, to eliminate or reduce calibration processes and equipment. An ideal scenario can be viewed as a type of "plug and play" system where the components, after leaving a manufacturing facility, are ready to function in the device without calibration. Therefore, one objective of embodiments is to provide a technique to reduce calibration processes and the need for calibration equipment.

For ease of description, some or all of the example systems presented herein are illustrated with a single example of each of its component parts. Some examples may not describe or illustrate all components of the systems. Other example embodiments may include more or fewer of each of the illustrated components, may combine some components, or may include additional or alternative components.

FIG. 1 illustrates a system 100 for scanning a radiated imaging plate to form an image according to one embodiment. In practice, the system 100 contained within a scanner (described below). In the example illustrated, the system 100 includes an imaging plate 105, a light source 110, a light collecting guide 115, a photomultiplier tube ("PMT") 120, and an analog-to-digital ("A/D") converter 125.

The imaging plate 105 is a device used to create an image and has a phosphor layer that can store x-ray energy and emit light when the phosphor layer is irradiated with visible light. An x-ray source (for example, mounted at the end of a support arm) is aligned with the imaging plate 105 that is positioned inside a patient's mouth. When activated, the x-ray source produces an x-ray beam. Radiation that passes through the patient's anatomy creates a radiograph of the patient's teeth on the phosphor layer of the imaging plate 105.

To obtain the radiograph or image stored in the phosphor layer, the imaging plate 105 is irradiated with light in a scanning process. In one example, the imaging plate 105 is moved in a linear direction 130 while being irradiated by the light source 110. In a different example, the imaging plate 105 is held still and light from the light source 110 is directed onto the imaging plate 105 in a scanning pattern to irradiate the image plate 105. For example, the light source 110 can be moved or pivoted to irradiate the imaging plate 105 to produce the image. In other embodiments, a mirror may be used to redirect light from the light source 110 to irradiate the imaging plate 105.

The light produced by the source 110 is reflected by the radiograph as the imaging plate 105 moves in the linear direction 130 or is scanned. In one embodiment, the light source 110 is a laser that produces a beam that is reflected by the radiograph. In other embodiments, the light source 110 is a blue light source or a UV light source.

Reflected light is collected by, for example, the light collecting guide 115. The light collecting guide 115 directs the collected light to the PMT 120. The PMT 120 (the structure and functionality of which is described in more detail below in regards to FIG. 2) applies the external photoelectric effect (described in more detail below) to output a current signal from either an anode or a cathode.

The PMT 120 is electrically coupled to the A/D converter 125. The output current signal from the PMT 120 is sent to the A/D converter 125, which converts the analog output current signal into digital data 135. The digital data 135 is then output as a digital image of the radiograph on the phosphor layer of the imaging plate 105.

Figure 2:
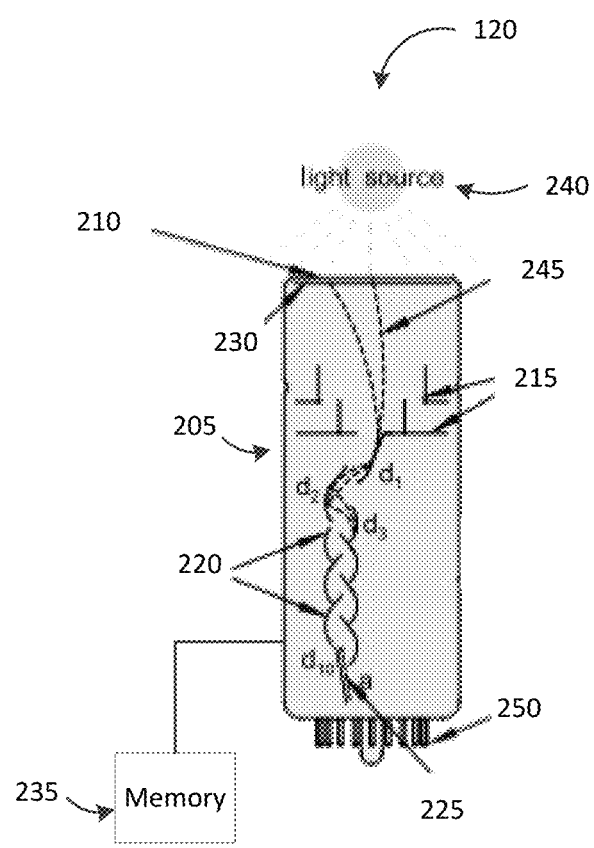
FIG. 2 illustrates a photomultiplier tube according to one embodiment.

FIG. 2 illustrates the PMT 120 according to one embodiment. The PMT 120 includes a housing 205 with a window

210. A focusing electrode 215 and an electron multiplier dynode 220 are located in the housing 205. The PMT 120 also includes an anode 225, a cathode 230, and a memory 235.

In one example, the housing 205 is a non-thermionic vacuum tube and is made out of glass. The window 210 allows light from a light source 240 to enter the housing 205 of the PMT 120. The light source 240 is, in one embodiment, the light reflected off of the radiograph of the imaging plate 105.

The external photoelectric effect is the emission of photoelectrons when light strikes a metal surface by the absorption of a sufficient amount of photons by the metal. When light enters the window 210 of the housing 205 from the light source 240, light strikes the cathode 230, causing the external photoelectric effect to occur. The cathode 230 may be a semi-transparent photocathode. The photoelectrons ejected from the cathode 230 follow an electron path 245 through the housing 205. The photoelectrons are focused along the electron path 245 and accelerated by the focusing electrode 215. In some embodiments, there may be more than one focusing electrode 215 located in the housing 205.

The focusing electrode 215 is designed to focus the photoelectrons towards the electron multiplier dynode 220. When the photoelectrons impact the electron multiplier dynode 220, the electron multiplier dynode 220 multiplies the input photoelectrons through a vacuum tube with a very high gain and directs the photoelectrons towards the anode 225.

The anode 225 collects the multiplied photoelectrons from the multiplier dynode 220. The anode 225 produces an output current signal and transmits the output current signal along anode connectors 250 based upon the photoelectrons collected by the anode 225. The anode connectors 250 are cables or wires that connect the anode 225 of the PMT 120 to the A/D converter 125, in one embodiment. In some embodiments, the cathode 230 may also generate an output current.

The memory 235 can be electrically connected to the PMT 120. The memory 235 may also include other external electrical connections, for example an input-output connection for a separate electrical system to access the memory 235. The memory 235 is configured to store, among other things, parameters of the PMT 120. As is described below in greater detail, useful parameters may include an anode blue sensitivity index or parameters to calculate the anode blue sensitivity index, collection efficiency, gain, a serial number of the PMT, a dark current value, luminous sensitivity, and a signal level at a reference voltage. The parameters may be associated with the anode 225 or the cathode 230 and may be further measured by or at the anode 225 or cathode 230.

In some embodiments, the memory 235 is an electrically erasable programmable read-only memory ("EEPROM") and utilizes inter-integrated circuits (I2C) protocol when communicating with other electronic components.

Optionally, a blue filter may be placed in front of the window 210 of the PMT 120 in order to determine the anode blue sensitivity index of the PMT 120. The anode blue sensitivity index is defined as the anode current obtained when the blue filter is placed in front of the window 210 of the PMT 120 and the anode blue sensitivity index is an important factor in comparing photomultiplier tubes of the same type. The anode blue sensitivity index allows for the selection of tubes with optimum sensitivity at certain desired wavelengths (in one embodiment, around 400 nanometer wavelengths).

The collection efficiency of the PMT 120 is defined as a probability that photoelectrons will land on an effective area of the electron multiplier dynode 220, where the photoelectrons will be multiplied. The collection efficiency is dependent upon a voltage between the cathode 230 and the electron multiplier dynode 220. Collection efficiency is at a maximum when the voltage between the cathode 230 and the electron multiplier dynode 220 is at approximately 150 volts.

The gain of the PMT 120 is an indicator of its amplification. Amplification is, in general, needed in low light detection applications, for example detecting reflected light from the imaging plate 105. The gain of the PMT 120 is a ratio of output current to an input cathode current and is calculated by Equation 1 below.

$$G = a^n + V^{k+n}/(n+1)^{k+n} \quad \quad \text{Equation 1:}$$

In Equation 1, G is the gain, "a" is the collection efficiency (nominally, 1), n is the number of electron multiplier dynodes 220, k is a known value dependent on the structure and material of the electron multiplier dynode 220 (between 0.7 and 0.8 for most calculations), and V is a supply voltage to the PMT 120. For a single PMT 120, n and k are fixed values, and therefore gain is primarily determined by the collection efficiency and the supply voltage provided to the PMT 120.

Figure 3A:
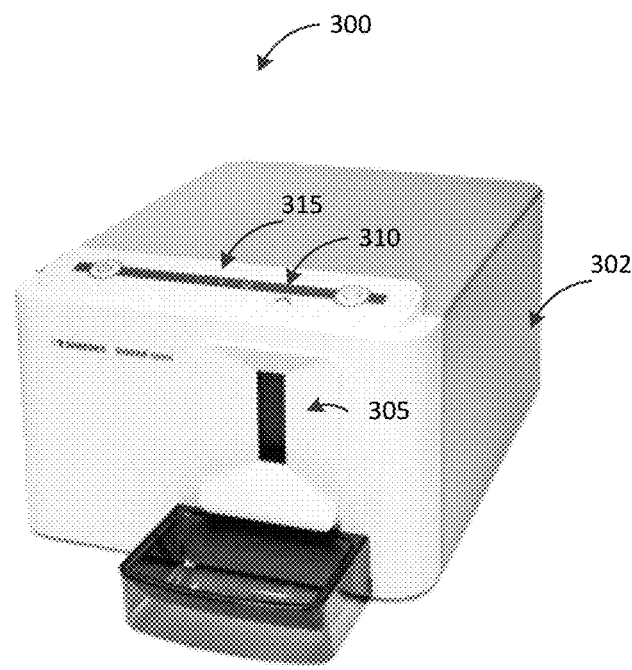
FIG. 3A illustrates an imaging plate scanner according to one embodiment.

FIG. 3A illustrates an imaging plate scanner 300 according to one embodiment. The imaging plate scanner 300 includes a scanner housing 302 and the system 100 (not shown in FIG. 3A, described further in FIG. 3B) is located within the scanner housing 302. In the example illustrated, the imaging plate scanner 300 also may also include an opening 305, an error indicator 310, and a ready indicator 315.

The opening 305 is an insertion point for the imaging plate 105. During image processing, the imaging plate 105 is inserted into the system 100 to be exposed to the light source 110. Insertion of the imaging plate 105 into the opening 305 may cause a mechanical component (not shown) of the imaging plate scanner 300 to scan the imaging plate 105 as discussed above. In some embodiments, a runner or other mechanisms can be used to assist in the insertion of the imaging plate 105 into the imaging plate scanner 300.

The error indicator 310 may be a light-emitting diode ("LED"), a display screen, a speaker, and the like. In general, the error indicator 310 is configured to provide an indication that an error has occurred during the operation of the system 100.

The ready indicator 315 may be an LED, a display screen, a speaker, or other output component. In general, the ready indicator 315 is configured to provide an indication that the imaging plate scanner 300 is prepared to perform a scan.

Figure 3B:
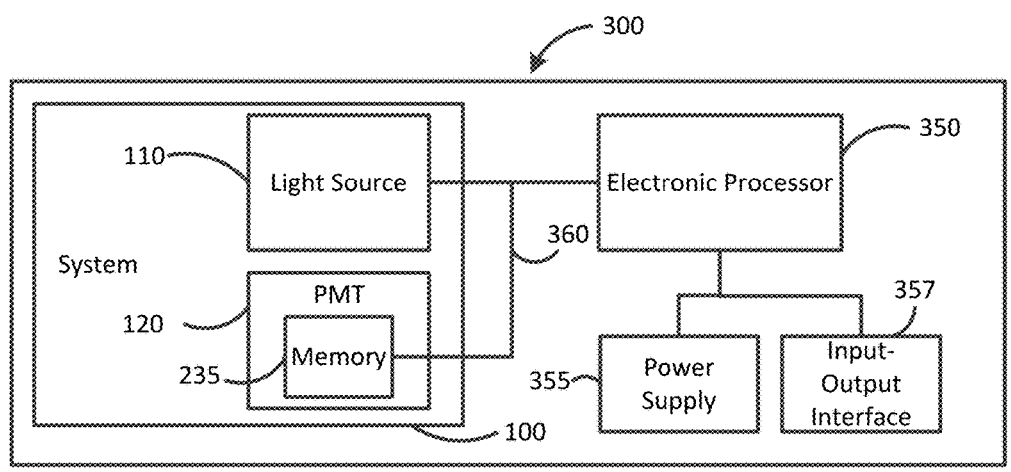
FIG. 3B illustrates a block diagram of an interior of an imaging plate scanner according to one embodiment.

FIG. 3B illustrates a block diagram of an interior of the imaging plate scanner 300 according to one embodiment. In the example shown, the imaging plate scanner 300 includes an electronic processor 350, memory 235, and the light source 110 of the system 100, a power supply 355, and an input-output interface 357.

The electronic processor 350 may be electrically coupled to the memory 235 of the PMT 120, for example, via a plug and socket connection. In some embodiments, the electronic processor 350 may be coupled to the memory 235 by an electronic bus (for example an electronic bus 360). It is also possible that other connections (whether wired or wireless) may be used.

The electronic processor 350 is configured to access the memory 235 and determine, based upon a parameter stored in the memory 235, a supply voltage value for the PMT 120. For example, the electronic processor 350 accesses the anode blue sensitivity index and determines the supply voltage necessary using a logarithmic relationship, for example, Equation 2 as shown below.

$$y = A \ln(x) + C \quad \text{Equation 2:}$$

In Equation 2, y is the given supply voltage (represented by a high voltage value as described below) and x is the anode blue sensitivity index of the PMT 120. A is a constant coefficient and C is a constant value. Therefore, the electronic processor 350 determines a supply voltage (high voltage value) by accessing the anode blue sensitivity index stored in the memory 235 of the PMT 120.

Equation 2 is determined by calibrating a plurality of photomultiplier tubes (for example, PMT 120). To calibrate a PMT, a manufacturer of the imaging plate scanner 300 applies a high voltage to the PMT and an output voltage or a high voltage (HV) value is measured. In one example, a HV value in the range of 100-230 is assumed to fall within acceptable tolerances or viewed as "successful" (a HV value of 100 being representative of 385 volts and 230 being representative of 885 volts supplied to the PMT). A manufacturer of the PMT 120 provides the HV value and other parameters of the PMT 120 to the purchaser of the PMT 120 (the purchaser being an entity such as the manufacturer of the imaging plate scanner 300) with the PMT 120 (for example, including the calibrated HV value in a datasheet for the PMT 120). A user re-calibrates the plurality of photomultiplier tubes to determine if the provided HV value was correct and whether there is variation of the HV values of the plurality of photomultiplier tubes.

Each of the plurality of photomultiplier tubes can have a different anode blue sensitivity index. By fluctuating the supply voltage values at an X-ray dosage level of 600 μGy, slightly different images are produced. For each image produced, a signal level is taken to determine a HV region where the signal level is smaller than 16,383 (an HV upper limit) in one example. The upper limit defines a maximum X-ray dosage level at which the imaging plate scanner 300 may operate, and ensures that an image does not saturate (e.g., lose image quality by blurring the image, being too bright, and the like) at the maximum X-ray dosage level.

By fluctuating the supply voltage values at an X-ray dosage level of 100 μGy and calculating the signal-to-noise-ratio ("SNR"), a HV region where the SNR is greater than 30 is determined (an HV lower limit) in one example. The lower limit defines a minimum X-ray dosage level at which the imaging plate scanner 300 may operate, and ensures that an image still maintains image quality (e.g., is not blurry or too dark) at the minimum X-ray dosage level.

It is to be understood that the HV upper limit and HV lower limit may vary for different photomultiplier tubes and the dosage levels used to determine the HV upper limit and HV lower limit (e.g., the 600 μGy X-ray dosage and the 100 μGy X-ray dosage) may also vary based upon the PMT 120, the imaging plate 105, the imaging plate scanner 300, and other factors. The values given above are meant purely as an example to illustrate how an HV operating range, defined by the HV upper limit and HV lower limit, is determined.

The HV upper limit and HV lower limit give an operating range of supply voltage to each of plurality of photomultiplier tubes. A correlation equation is then determined by taking the anode blue sensitivity index of each of the plurality of photomultiplier tubes (also calculated from the parameters given by the manufacturer and provided with each of the plurality of photomultiplier tubes in a data sheet or in the memory 215, similar to the HV values) and correlating the value with the calculated HV values of each of the plurality of the photomultiplier tubes. Equation 2 results from the correlation of the anode blue sensitivity index and the HV values of each of the plurality of photomultiplier tubes. As shown by Equation 2, the higher the anode blue sensitivity index of a photomultiplier tube, the lower the required supply voltage. In some embodiments, the HV values are calculated once and stored in the memory 235 for access by the electronic processor 350. In other embodiment, the HV values for the PMT 120 are calculated every time the PMT 120 is electrically coupled to the electronic processor 350.

The electronic processor 350 is also configured to activate the light source 110 of the system 100 in order to cause light to reflect off of the phosphor layer of the imaging plate 105 into the PMT 120 and determine the output current of the anode 225 and/or the current of the cathode 230. The electronic processor 350 is configured to generate an error message or an error indication if the output current deviates from an expected range. The deviation of the output current from an expected range is indicative of an error or anomaly related scanning of the imaging plate 105 (for example, a poorly-captured radiograph present on the imaging plate 105 or an error in performing the scan, for example a blockage of the light source 110) or of the components of the imaging plate scanner 300. The electronic processor 350 may be further electrically coupled to the error indicator 310. Upon determining the existence of an error, the electronic processor 350 sends a signal to the error indicator 310, which outputs a corresponding error message or error indication perceivable by a user of the imaging plate scanner 300.

The electronic processor 350 is electrically coupled to the power supply 355 and sends the determined supply voltage value to the power supply 355. The power supply 355 powers the imaging plate scanner 300 and also supplies the supply voltage to the PMT 120 based upon the supply voltage value determined by the electronic processor 350. In some embodiments, the power supply 355 is a battery. In other embodiments, the power supply 355 is designed to be connected to a wall outlet or other source of grid power.

The input-output interface 357 allows the imaging plate scanner 300 to communicate with systems external to the imaging plate scanner 300. In one embodiment, the input-output interface 357 includes hardware to directly connect the imaging plate scanner 300 to external systems, for example, a computer system. In another embodiment, the input-output interface 357 is a wireless transceiver configured to allow external systems to communicate with the imaging plate scanner 300.

The input-output interface 357 may further be configured to allow a user to interact with the imaging plate scanner 300. For example, the input-output interface 357 may include buttons, a display screen, a touch screen, or some other device to allow a user to interact with the imaging plate scanner 300. For example, the user may be able to access parameters, see results, or change an operating parameter of the imaging plate scanner 300 using the input-output interface 357.

Figure 4:
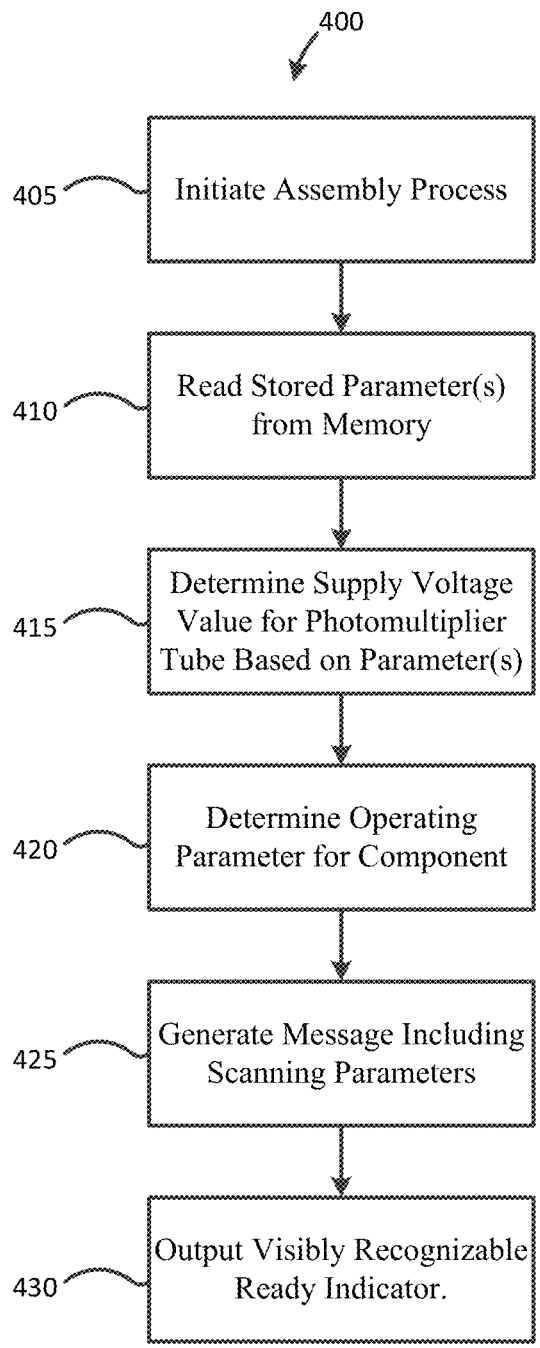
FIG. 4 illustrates a method of incorporating a photomultiplier tube into an imaging plate scanner according to one embodiment.

FIG. 4 illustrates a method 400 of incorporating the PMT 120 into the imaging plate scanner 300 according to one embodiment. The method 400 includes initiating an assembly process (at block 405). During the assembly process, the electronic processor 350 of the imaging plate scanner 300 calibrates components of the imaging plate scanner 300.

The method 400 includes reading, with the electronic processor 350, at least one of the stored parameters in the memory 235 of the PMT 120 (at block 410). For example, the electronic processor 350 reads the stored anode blue sensitivity index from the memory 235. The electronic processor 350, in some embodiments, reads more than one parameter stored in the memory 235.

The method 400 includes determining, with the electronic processor 350, a supply voltage value for the PMT 120 based upon the parameter read from the memory 235 (at block 415). In one embodiment, the electronic processor 350 reads the stored parameter, for example the blue sensitivity index, from the memory 235 at block 410 and then uses Equation 2 (as discussed above) in order to determine the supply voltage value. In another embodiment, the electronic processor 350 determines the supply voltage value based upon a dark current, a signal level at a reference voltage, or other parameters stored in the memory 235.

The method 400 includes determining, with the electronic processor 350, at least one operating parameter for the first component of the imaging plate scanner 300 (at block 420). For example, the electronic processor 350 may determine a luminosity value for the light source 110, a speed at which the imaging plate 105 is moved through the imaging plate scanner 300, a gain for the electron multiplier dynode 220, and the like. In some embodiments, the electronic processor 350 may use the stored parameter to determine the operating parameter for the first component. In other embodiments, a user may input a parameter, a modification to a parameter, or a confirmation of a parameter using the input-output interface 357.

The method 400 includes generating, with the electronic processor 350, a message including scanning parameters (at block 425). The electronic processor 350 may be configured to access the scanning parameters (which may include speed of imaging plate 105, the anode blue sensitivity index, the supply voltage, and the like) from the memory 235 and then generate the message. In some embodiments, the message only includes numerical values and quantitative information about the scanning parameters. In other embodiments, the message includes text generated by the electronic processor 350. The text may be only the identifier of the scanning parameter or may be full statements describing the scanning parameters.

In some embodiments, the electronic processor 350 may output the message to a display screen to display to a user. In other embodiments, the electronic processor 350 (using the input-output interface 357) can send the message to a computer system coupled to the imaging plate scanner 300.

The method 400 includes outputting, using the electronic processor 350, a visibly recognizable ready indicator (at block 430). In one embodiment, the ready indicator 315 is an LED. The electronic processor 350 outputs a signal to the ready indicator 315 to turn on. In another embodiment, the electronic processor 350 outputs the message generated at block 425 to a display screen as the visibly recognizable ready indicator. In some embodiments, if calibration of the first component has failed, the electronic processor 350 may be configured to turn on the error indicator 310.

Figure 5:
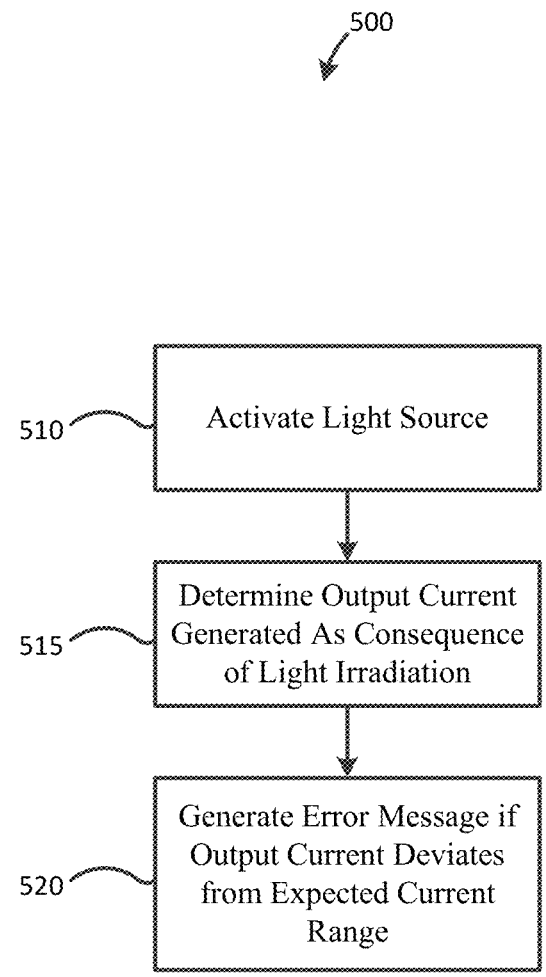
FIG. 5 illustrates a method of checking the operational status of a photomultiplier tube having a window, an anode, a cathode, and a memory storing a parameter of the anode or cathode according to one embodiment.

FIG. 5 illustrates a method 500 of checking the operational status of PMT 120 according to one embodiment. The method 500 may be performed while the PMT 120 is contained within the imaging plate scanner 300. In other embodiments, the PMT 120 may be removed from the imaging plate scanner 300 to perform the method 500. The electronic processor 350 first generates a supply voltage for the PMT 120. For example, the electronic processor 350 may generate a constant supply voltage to test the PMT 120. In other embodiments, the electronic processor 350 generates a set of constant supply voltages to test the PMT 120 at various voltage levels.

In some embodiments, the reflection of the light source 110 off of the imaging plate 105 is used as a test light source. In other embodiments, a different light source is used. In some embodiments, the test light source is positioned in response to a signal from the electronic processor 350. The test light source may also be manually positioned.

The method 500 includes activating the test light source (at block 510). The activation of the test light source simulates the imaging plate scanner 300 in operation. The test light source may be activated automatically in response to a signal from the electronic processor 350 or manually.

The method 500 includes determining, with the electronic processor 350, an output current generated as a consequence of light irradiation (at block 515). As described above, the PMT 120 takes in light and outputs a current based upon the light taken in. For example, a higher concentration of light taken in may result in a larger amplitude of the output current. The electronic processor 350 may be configured to detect the current output from the anode 225. In some embodiments, the electronic processor 350 also determines a level of noise in the output current and accounts for the level of noise when determining the output current.

In some embodiments, the PMT 120 takes in light reflected from a test image. The test image can be generated by changing an intensity of reference light from the test light source. This may be done during a reading of a parameter from the PMT 120. The intensity of the test light source (and therefore of the generated test image) produces a desired brightness level (for example, a brightness level that indicates the imaging plate scanner 300 is working correctly). The test image emits light at a brightness level, which may then be used to generate the output current as described at block 515.

The method 500 includes generating, with the electronic processor 350, an error message if the output current deviated from an expected current range (at block 520). If the output current deviated from the expected current range, the PMT 120 is not operating correctly (and therefore will not output the current image based upon the light being received by the PMT 120). In some embodiments, the error message generated by the electronic processor 350 includes an actual value of the output current, the expected current range, and how much the output current deviated from the expected current range. In other instances, the error message only includes quantitative values. The error message may include text that explains the error.

In some embodiments, the electronic processor 350 is further configured to output the error message to the error indicator 310 of the imaging plate scanner 300. In one embodiment, the error indicator 310 is a display screen that displays the error message to a user of the imaging plate scanner 300. In another embodiment, the error indicator 310 is an LED and, in response to the error message being generated, the electronic processor 350 sends a signal to turn the error indicator 310 on to notify to a user that an error has occurred.

In other embodiments, if an error occurs, the electronic processor 350 may be configured to determine a new supply voltage for the PMT 120. The electronic processor 350 is configured to determine by how much the output current deviated from the expected current range, adjust a supply voltage, and save a new HV value for the PMT 120 in the memory 235.

In some embodiments, the method 500 is performed when the imaging plate scanner 300 is manufactured in order to determine that the imaging plate scanner 300 is working correctly. In other embodiments, the method 500 is performed in a quality assurance step after manufacture but before shipping the imaging plate scanner 300 for sale. The method 500 may be used to confirm an HV value of the imaging plate scanner 300.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A photomultiplier tube for use in an imaging plate scanner, the photomultiplier tube comprising:
    a housing having a window;
    a focusing electrode located in the housing;
    an electron multiplier dynode located in the housing;
    an anode;
    a cathode and
    a memory storing parameters.

2. The photomultiplier tube as claimed in claim 1, wherein the memory stores parameters related to the anode or the cathode.

3. The photomultiplier tube as claimed in claim 2, wherein the memory stores a serial number for the photomultiplier tube.

4. The photomultiplier tube as claimed in claim 1, wherein the memory stores parameters measured from the anode or the cathode.

5. The photomultiplier tube as claimed in claim 1, wherein the memory stores a blue sensitivity index for the anode.

6. The photomultiplier tube as claimed in claim 1, wherein the memory stores at least one selected from the group consisting of a dark current value, a luminous sensitivity, and a signal level at a reference voltage.

7. The photomultiplier tube as claimed in claim 1, wherein the memory comprises electrically erasable programmable read-only memory.

8. The photomultiplier tube as claimed in claim 1, wherein the memory is configured to be read from and written to in accordance with an inter-integrated circuits (I2C) protocol.

9. An imaging plate scanner comprising:
    a photomultiplier tube having a window, an anode, and a cathode;

a light source positioned to radiate light on the anode or cathode; and an electronic processor communicatively coupled to the light source and configured to generate a supply voltage value for the photomultiplier tube, activate the light source and determine an output current of the anode or of the cathode, and generate an error message if the output current deviates from an expected current range; and a power supply electrically connected to the electronic processor and configured to generate the supply voltage for the photomultiplier.

10. The imaging plate scanner as claimed in claim 9, wherein the light source is a blue light source or a UV light source.

11. The imaging plate scanner as claimed in claim 9, further comprising a memory and a bus electrically connecting the electronic processor to the memory.

12. The imaging plate scanner as claimed in claim 11, wherein the memory stores a blue sensitivity index.

13. The imaging plate scanner as claimed in claim 12, wherein the electronic processor is further configured to determine the supply voltage for the photomultiplier tube in accordance with a negative logarithm of the blue sensitivity index and a constant.

14. The imaging plate scanner as claimed in claim 11, wherein the memory stores a serial number for the photomultiplier tube.

15. The imaging plate scanner as claimed in claim 11, wherein the memory comprises electrically erasable programmable read-only memory.

16. A method of assembling an imaging plate scanner that includes a first component and a photomultiplier tube having a window, an anode, a cathode, and a memory storing a parameter of the anode or cathode, the method comprising:

initiating, via an electronic processor of the imaging plate scanner, an assembly process;

reading, via the electronic processor, the stored parameters from the memory;

determining, via the electronic processor, a supply voltage value for the photomultiplier tube in accordance with a parameter of the anode or cathode;

determining, via the electronic processor, an operating parameter for the first component;

generating, via the electronic processor, a message including scanner parameters; and outputting, via the electronic processor, a visibly recognizable ready indicator.

17. A method as claimed in claim 16, wherein determining, via the electronic processor, a supply voltage value for the photomultiplier in accordance with a parameter of the anode or cathode includes determining the supply voltage value in accordance with a negative logarithm of a blue sensitivity index and a constant.

18. A method of checking the operational status of photomultiplier tube having a window, an anode, a cathode, and a memory storing a parameter of the anode or cathode, the method comprising:

positioning a light source with respect to the anode and cathode so that the anode and cathode are within a light output field of the light source;

activating the light source;

determining an output current of the anode or of the cathode generated as a consequence of light from the light source irradiating the anode or the cathode, and generating an error message if the output current deviates from an expected current range.

* * * * *